(12) United States Patent
Ranjan et al.

(10) Patent No.: US 8,387,112 B1
(45) Date of Patent: Feb. 26, 2013

(54) AUTOMATIC SOFTWARE UPDATE ON NETWORK DEVICES

(75) Inventors: Ashish Ranjan, San Jose, CA (US); Harshad Nakil, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1153 days.

(21) Appl. No.: 12/260,758

(22) Filed: Oct. 29, 2008

(51) Int. Cl.
*G06F 21/00* (2006.01)

(52) U.S. Cl. ............ 726/2; 717/168; 717/169; 717/170; 717/171; 717/172

(58) Field of Classification Search ...................... 726/2; 717/168–173
See application file for complete search history.

(56) References Cited

U.S. PATENT DOCUMENTS

| | | | | |
|---|---|---|---|---|
| 6,442,158 | B1 * | 8/2002 | Beser ............................. | 370/352 |
| 7,653,745 | B1 * | 1/2010 | Biswas et al. ................. | 709/245 |
| 2003/0110484 | A1 * | 6/2003 | Famolari ....................... | 717/173 |
| 2003/0123481 | A1 * | 7/2003 | Neale et al. ................... | 370/466 |
| 2004/0228310 | A1 * | 11/2004 | Collins .......................... | 370/338 |
| 2005/0216903 | A1 * | 9/2005 | Schaefer ....................... | 717/168 |
| 2006/0047826 | A1 * | 3/2006 | Cromer et al. ................ | 709/229 |
| 2006/0080656 | A1 * | 4/2006 | Cain et al. ..................... | 717/174 |
| 2008/0183769 | A1 * | 7/2008 | Regan et al. .................. | 707/201 |

* cited by examiner

*Primary Examiner* — Oscar Louie
*Assistant Examiner* — Lisa Lewis
(74) *Attorney, Agent, or Firm* — Harrity & Harrity, LLP

(57) ABSTRACT

A method may include contacting, by a network device, another device to obtain at least one of a network address, authentication, or authorization, receiving, from the other device, software update information that identifies an up-to-date software that the network device should have installed and location information that identifies a location from which to retrieve the up-to-date software, comparing, by the network device, the software update information to software information that identifies software currently installed on the network device, retrieving, by the network device, the up-to-date software based on the software update information and the location information when the software update information and the software information do not match, and auto-installing, by the network device, the up-to-date software.

21 Claims, 8 Drawing Sheets

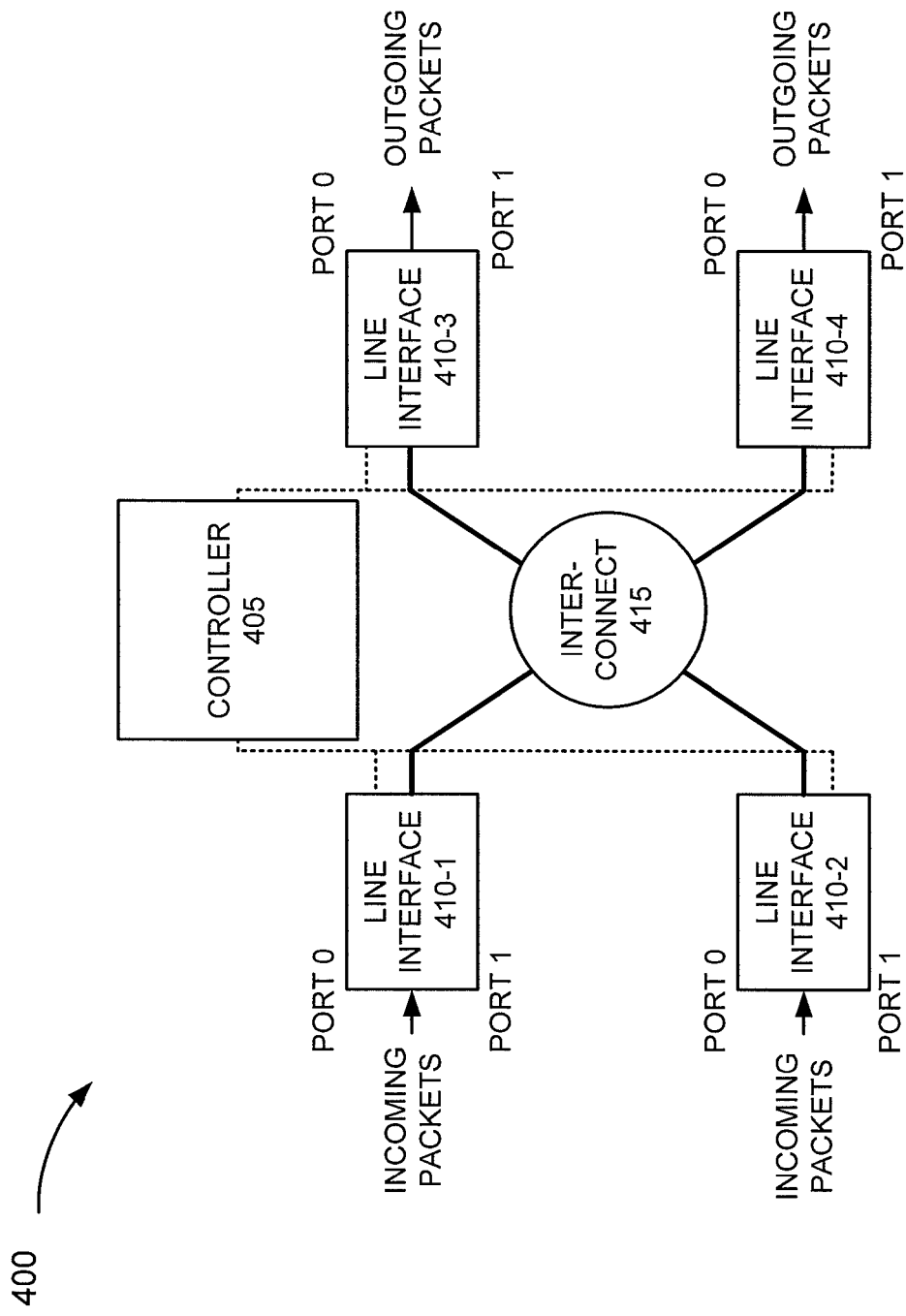

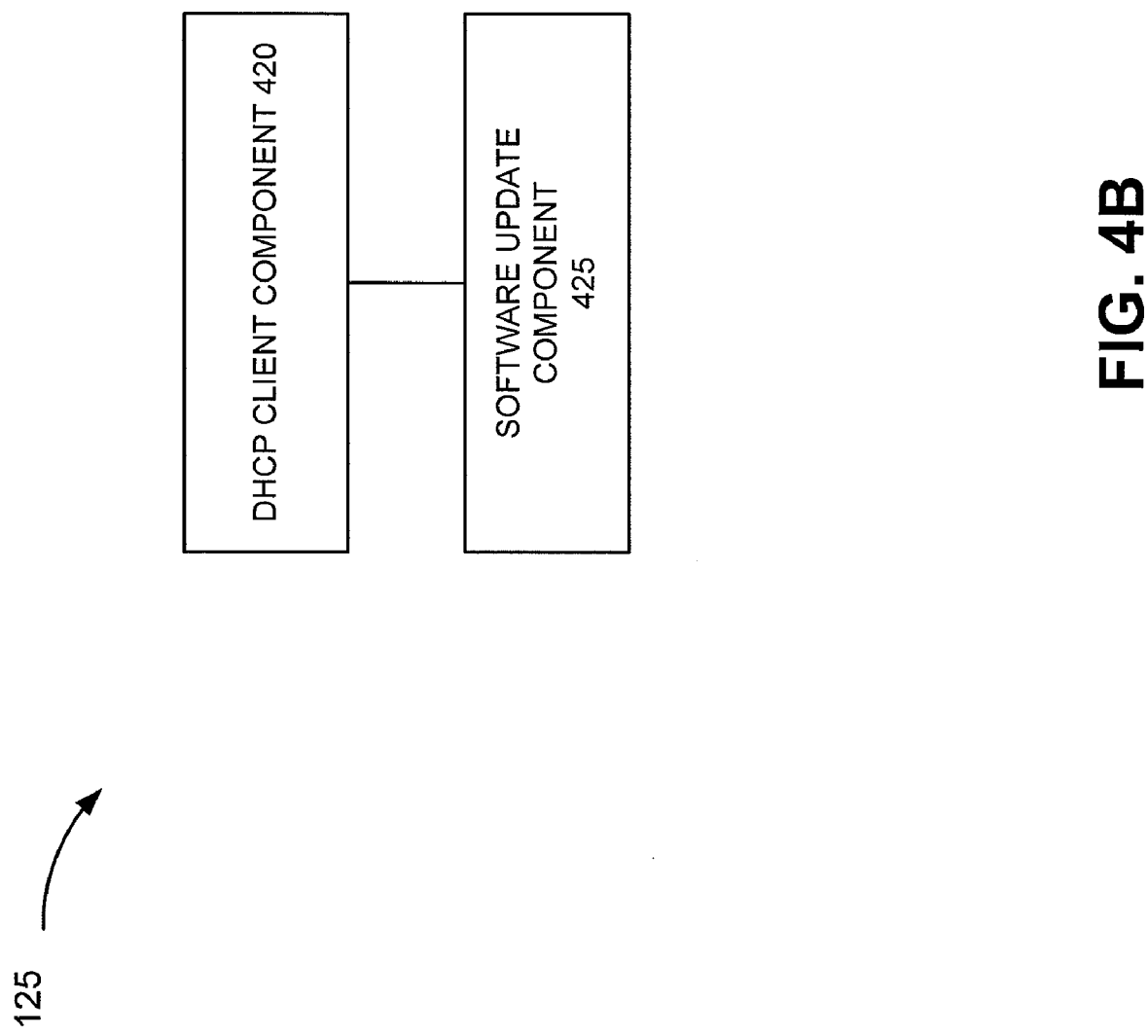

US 8,387,112 B1

AUTOMATIC SOFTWARE UPDATE ON NETWORK DEVICES

BACKGROUND

Operations, administration, and management (OAM) refers to the processes, tools, standards, etc., involved in operating, administrating and maintaining a system. In a network environment, there may exist a large number of networking devices (e.g., switches, routers, security devices, etc.). In such an environment, a network administrator may be responsible for updating the software on all of the network devices. For example, the network administrator may connect to each network device (e.g., Telnet) and manually update the software for each network device via a command-line interface (CLI). Alternatively, the administrator may utilize a centralized management station to update each network device. In either case, the process of updating software for each network device can occupy a significant amount of time, require scheduling, and require complex tracking of the software installed on each network device.

SUMMARY

According to one aspect, a method may include contacting, by a network device, another device to obtain at least one of a network address, authentication, or authorization, receiving, from the other device, software update information that identifies an up-to-date software that the network device should have installed and location information that identifies a location from which to retrieve the up-to-date software, comparing, by the network device, the software update information to software information that identifies software currently installed on the network device, retrieving, by the network device, the up-to-date software based on the software update information and the location information when the software update information and the software information do not match, and auto-installing, by the network device, the up-to-date software.

According to another aspect, a device may include one or more components that may send a request to another device to obtain at least one of an assignment of a network address for the device, authentication, or authorization, receive a response to the request, the response may include software update information that identifies an up-to-date software that the device should have installed and a network address where the up-to-date software can be retrieved, compare the software update information to software information that identifies software currently installed on the device, retrieve the up-to-date software at the network address where the up-to-date software resides when the software update information and the software information do not match, and auto-install the up-to-date software.

According to yet another aspect, a computer-readable memory device may have stored thereon instructions executable by at least one processor. The computer-readable memory device may include one or more instructions to request at least one of an assignment of a network address, or authentication and authorization to connect to a network, one or more instructions to extract from a response to the request software update information that identifies an up-to-date software that should be installed in a device and an address where the up-to-date software can be retrieved, one or more instructions to determine that the software update information does not match software information that identifies software installed on the device, one or more instructions to retrieve the up-to-date software at the address, and one or more instructions to auto-install the up-to-date software.

According to still another aspect, a network device may include means for transmitting a DHCPDISCOVER message to a DHCP server; means for receiving a DHCPOFFER message from the DHCP server, means for extracting from the DHCPOFFER message software update information that identifies an up-to-date software that the network device should have installed and location information that identifies a location from which to retrieve the up-to-date software, means for determining whether the software update information and software information that identifies software currently installed on the network device match, means for retrieving the up-to-date software based on the software update information and the location information when the software update information and the software information do not match, and means for auto-installing the up-to-date software.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 4A is a diagram illustrating exemplary components of a device that may correspond to one or more devices depicted in FIG. 1;

FIG. 4B is a diagram illustrating exemplary functional components that may reside on the network devices depicted in FIG. 1;

DETAILED DESCRIPTION

Figure 1:
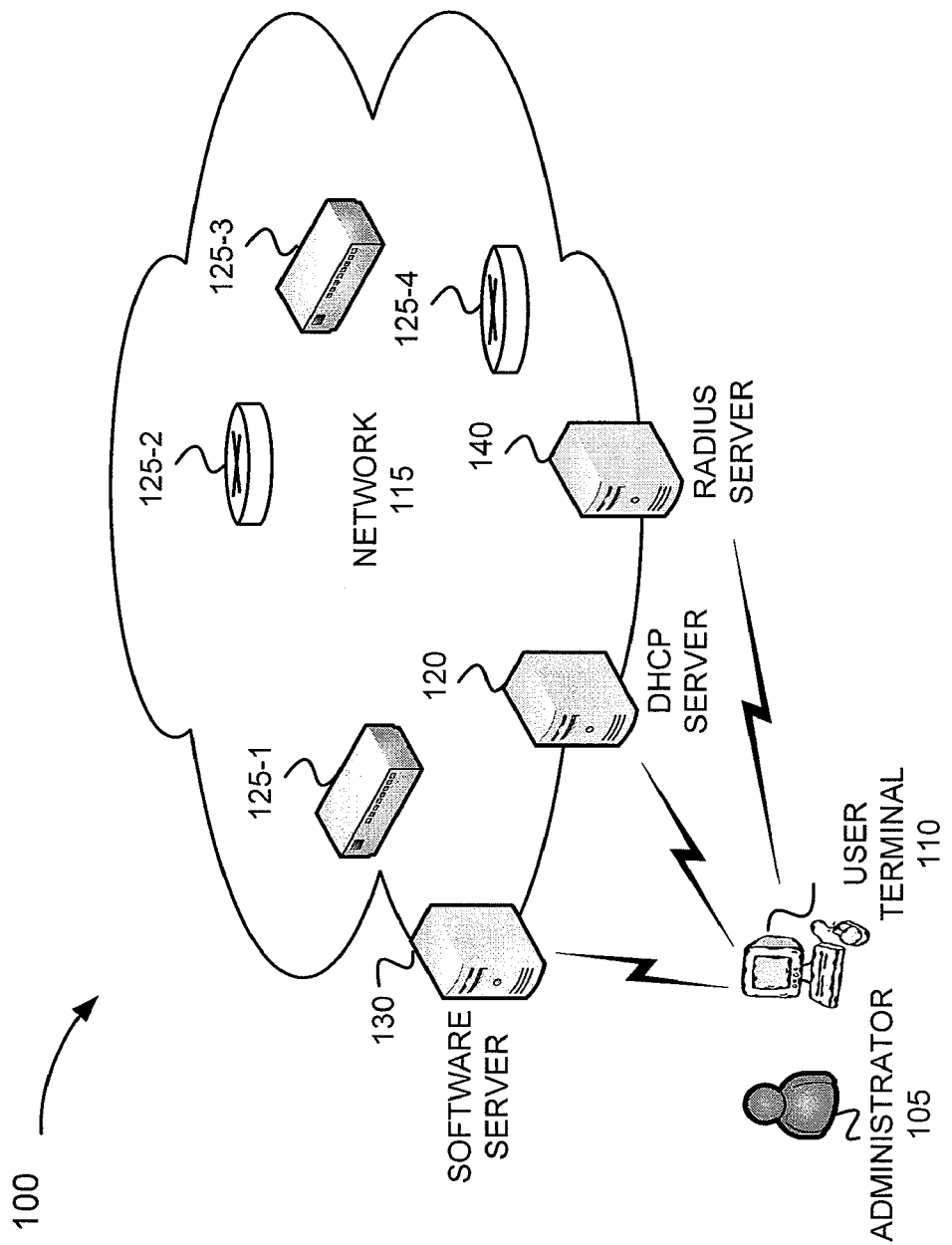
FIG. 1 is a diagram illustrating an exemplary environment in which concepts described herein may be implemented.

The following detailed description refers to the accompanying drawings. The same reference numbers in different drawings may identify the same or similar elements. Also, the following description does not limit the invention.

Overview

The concepts described herein relate to the automatic updating of software for network devices. For purposes of discussion, the network devices may include routers and switches. However, it will be appreciated that these concepts may be applicable to other types of network devices (e.g., security devices, firewalls, bridges, etc.).

As will be described below, a network device (e.g., a Dynamic Host Configuration Protocol (DHCP) server, a Remote Authentication Dial In User Service (RADIUS) server, a BOOTP server, or another type of server which other network devices are preconfigured to access during boot-up and/or in response to some other type of event) may provide other network devices (e.g., a router or a switch) with update information (e.g., information regarding the latest version of software that should be installed, information regarding new software in which a previous version may not reside on the network devices, etc.) and location information (e.g., a network address) that identifies where up-to-date software may be retrieved. When the network devices receive this information, they may compare the update information to their existing software information (e.g., the version of software currently installed, software installed, etc.). If the update information and the software information do not match, the network devices may download the software from a device at the location corresponding to the location information. The network devices may then auto-install the up-to-date software. Conversely, if the update information and the software information do match, the network devices have knowledge that they are running the most up-to-date software. In such instances, the network devices may not need to download the up-to-date software.

In one embodiment, a DHCP server may provide a network device with the update information and the location information when the network device boots up and is seeking an Internet Protocol (IP) address. In other embodiments, the automatic software update scheme may be based on different events, other than, or in addition to, device boot-up. For example, when an IP address has a lease time that is about to expire, the network device may communicate with the DHCP server for another IP address, which may trigger the DHCP server to provide update information and/or location information. Additionally, or alternatively, the automatic software update scheme may be scheduled (e.g., periodically). In still other embodiments, a RADIUS server, a BOOTP server, or some other type of device (e.g., a gateway) may be employed.

As a result of the foregoing, software may be updated automatically across a network environment. In this regard, the maintaining of software in the network environment may be significantly simplified. Since concepts have been broadly described, variations to the above concepts exist and will be described further below.

Exemplary Environment

FIG. 1 is a diagram illustrating an exemplary environment in which concepts described herein may be implemented. As illustrated in FIG. 1, an exemplary environment 100 may include an administrator 105, a user terminal 110, and a network 115. Network 115 may include a DHCP server 120, network devices 125-1 through 125-4, a software server 130, and a RADIUS server 140.

Administrator 105 may administer and manage network 115. Administrator 105 may utilize user terminal 110 to perform various OAM procedures. Although not illustrated, the devices in network 115 may be communicatively coupled.

User terminal 110 may include a computational device having communication capability. For example, user terminal 110 may include a computer (e.g., a desktop computer, a laptop computer, or a handheld computer).

Network 115 may include any type of network, such as, for example, a local area network (LAN), a wide area network (WAN), a telephone network (e.g., a public switched telephone network (PSTN) or a wireless communication network), the Internet, a private network, etc., or a combination of networks. Network 115 may include various devices that permit communication to take place via a wired and/or wireless media.

DHCP server 120 may include a device having communication capability. For example, DHCP server 120 may include a network computer. DHCP sever 120 may automate the assignment of IP addresses, subnet masks, default gateways, and other IP parameters. As will be described below, DHCP server 120 may perform various operations associated with the automatic updating of software for network devices in environment 100. It will be appreciated that in other implementations, a RADIUS server 140 or a BOOTP server (not illustrated) may perform operations analogous to those described in relation to the automatic software updating of network devices.

Network devices 125-1 through 125-4 may each include a device having communication capability. For example, network devices 125-1 through 125-4 may each include a router, a bridge, a switch, a gateway, a computer, a security device (e.g., a firewall), and/or some other type of network device. Network devices 125-1 through 125-4 may include various interfaces and/or support various protocols (e.g., DHCP, IP, etc.). For purposes of illustration, network device 125-1 and 125-3 may each correspond to a router, and network devices 125-2 and 125-4 may each correspond to a switch. Network devices 125-1 through 125-4 may each include a DHCP client.

Software server 130 may include a device having communication capability. For example, software server 130 may include a network computer. Software server 130 may store up-to-date software for network devices 125-1 through 125-4.

RADIUS server 140 may include a device having communication capability. For example, RADIUS server 140 may include a network computer. RADIUS server 140 may provide authentication, authorization, and accounting (AAA) services in network 115.

Although FIG. 1 illustrates an exemplary environment 100, in other implementations, environment 100 may include fewer, additional, and/or different devices, or differently arranged devices than those illustrated in FIG. 1. For example, environment 100 may include a BOOTP server or some other type of server that network devices 125-1 through 125-4 may be configured to access during boot-up and/or access in response to some other type of event. Thus, it will be appreciated that environment 100 is exemplary in terms of, among other things, the number of devices, the connections between the devices, the type of devices, etc. Additionally, or alternatively, in other implementations, one or more operations described as being performed by a specific device may be performed by, for example, one or more other devices or, in a combination of the specific device and the one or more other devices. Further, it will be appreciated that operations and/or processes described herein may be performed in a distributed environment where such operations and/or processes may be performed by remote processing devices that are communicatively coupled to environment 100.

Exemplary User Terminal/DHCP Server Architecture

Figure 2:
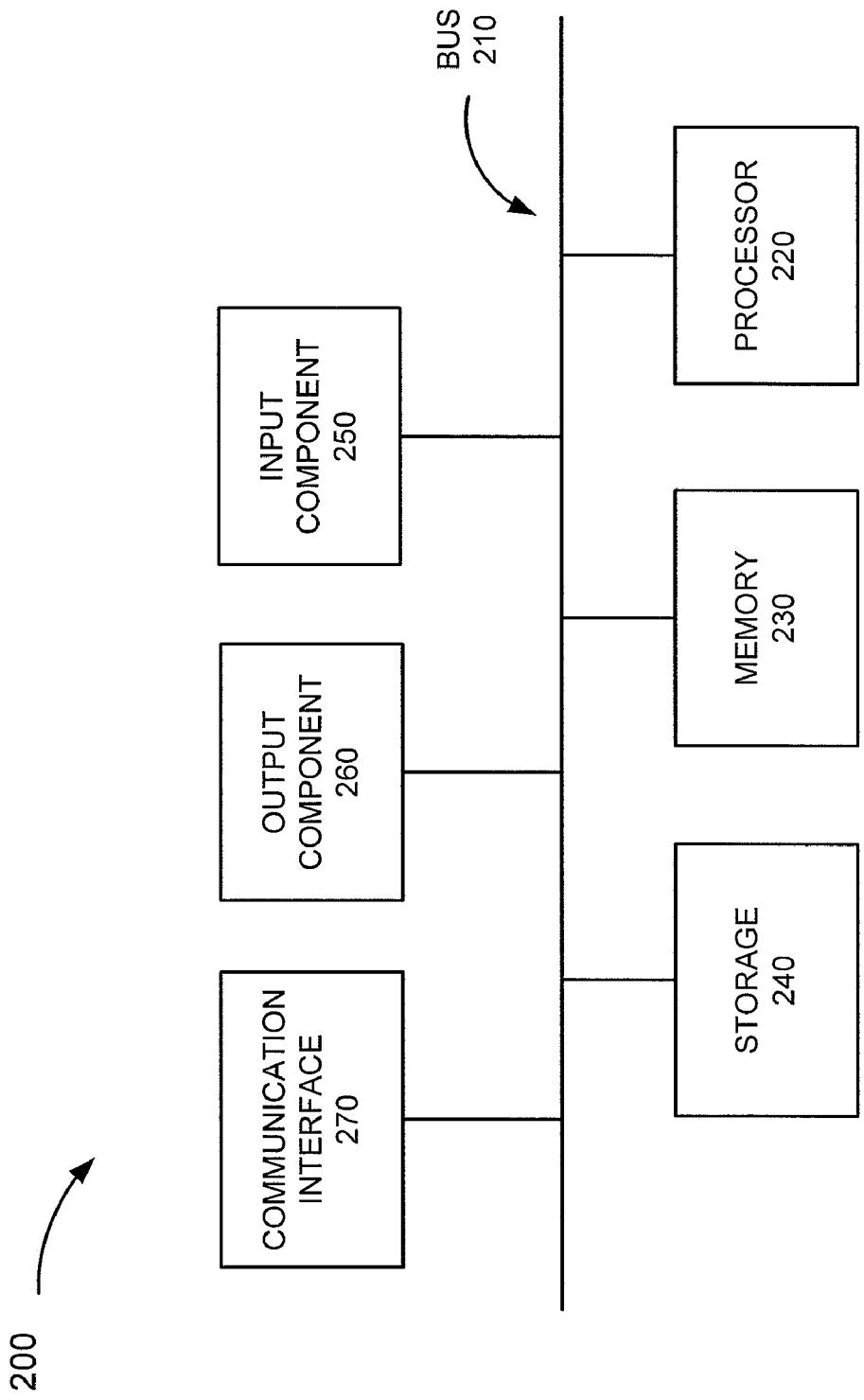
FIG. 2 is a diagram illustrating exemplary components of a device that may correspond to one or more devices depicted in FIG. 1.

FIG. 2 is a diagram illustrating exemplary components of a device that may correspond to one or more devices depicted in FIG. 1. For example, device 200 may correspond to user terminal 110, DHCP server 120, software server 130, and/or RADIUS server 140. As illustrated, device 200 may include, for example, a bus 210, a processor 220, a memory 230, storage 240, an input component 250, an output component 260, and/or a communication interface 270.

Bus 210 may permit communication among the other components. For example, bus 210 may include a system bus, an address bus, a data bus, and/or a control bus. Bus 210 may also include bus drivers, bus arbiters, bus interfaces, and/or clocks.

Processor 220 may interpret and/or execute instructions and/or data. For example, processor 220 may include a general-purpose processor, a microprocessor, a data processor, a co-processor, a network processor, an application specific integrated circuit (ASIC), a controller, a programmable logic device, a chipset, a field programmable gate array (FPGA), or some other logic device or component that may interpret and/or execute instructions. Processor 220 may control one or more other components.

Memory 230 may store data and/or instructions. For example, memory 230 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 240 may store data and/or software applications. For example, storage 240 may include a hard disk (e.g., a magnetic disk, an optical disk, a magneto-optic disk, etc.), a compact disc (CD), a digital versatile disc (DVD), a floppy disk, a cartridge, a magnetic tape, or another type of computer-readable medium, along with a corresponding drive. The term "computer-readable medium" is intended to be broadly interpreted to include a physical or a logical memory device.

Memory 230 and/or storage 240 may also include a storing device external to and/or removable from device 200, such as a Universal Serial Bus (USB) memory stick, a hard disk, etc.

Input component 250 may permit input to device 200. For example, input component 250 may permit a user and/or a device to input information. Input component 250 may include, for example, a keyboard, a keypad, a mouse, a button, a switch, a microphone, voice recognition logic, a pen, a port, etc. Output component 260 may permit output from device 200. For example, output component 260 may output information to a user and/or a device. Output component 260 may include, for example, a display, a speaker, one or more light emitting diodes (LEDs), a port, a vibrator, etc.

Communication interface 270 may include any transceiver-like mechanism that enables device 200 to communicate with other devices and/or systems. For example, communication interface 270 may include an Ethernet interface, an optical interface, a coaxial interface, a wireless interface, or the like.

Although, FIG. 2 illustrates exemplary components of device 200, in other implementations, device 200 may include fewer, additional, different, and/or differently arranged components than those depicted in FIG. 2. In still other implementations, one or more operations described as being performed by a particular component may be performed by one or more other components.

Exemplary Software Update Components

Figure 3:
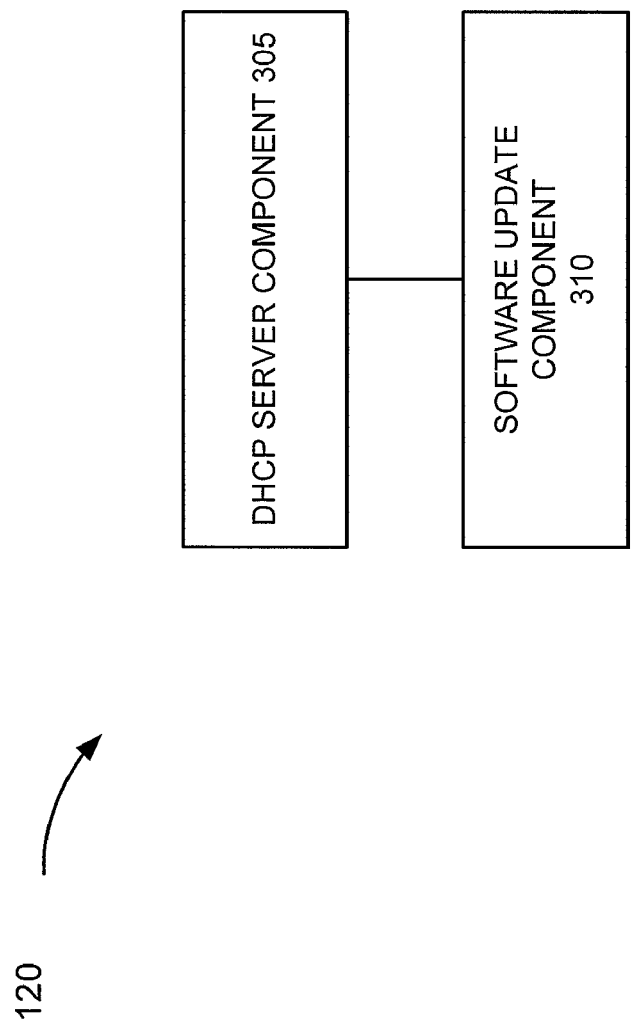
FIG. 3 is a diagram illustrating exemplary functional components that may reside on the DHCP server depicted in FIG. 1.

FIG. 3 is a diagram illustrating exemplary functional components that may provide for the automatic updating of software. As illustrated, DHCP server 120 may include a DHCP server component 305 and a software update component 310. DHCP server component 305 and/or software update component 310 may be implemented by software executed by one or more processors (e.g., processor 220). In other instances, DHCP server component 305 and/or software update component 310 may be implemented by hardware, firmware, and/or other combinations of components. The term "component," as used herein is intended to be broadly interpreted to include, for example, hardware, a combination of hardware and software, and/or firmware.

DHCP server component 305 may communicate with network devices 125-1 through 125-4 according to the automatic software updating scheme described herein. DHCP server component 305 may utilize various protocols (e.g., DHCP, IP, etc.) and automatically perform various operations according to the automatic software updating scheme. DHCP server component 305 may include software update information and location information in one or multiple DHCP packets. For example, the software update information and the location information may be included in an options field of the DHCP message format. The software update information and location information may be provided by software update component 310.

Software update component 310 may provide software update information and location information to DHCP server component 305. For example, administrator 105 may provide the software update information and location information via user terminal 110. Software update component 310 may insert the software update information and the location information into a DHCP packet (e.g., DHCPOFFER message, a DHCPACK message) when a DHCPDISCOVER message is received from a DHCP client of a network device 125. The software update information may include, for example, the name of the software, the version of the software, and/or some other indicator (e.g., a string) that identifies the up-to-date software. The location information may include, for example, a network address (e.g., an IP address) or a network address and protocol (e.g., file transfer protocol (FTP) from 192.168.1.5) to obtain the up-to-date software. For purposes of discussion, the location information may correspond to the network address of software server 130. In other embodiments, software update component 310 may insert software update information and the location information into a RADIUS Access Challenge message, a BOOTP reply message, etc., when a BOOTP request message, a RADIUS Access Request message, etc. is received.

Although FIG. 3 illustrates exemplary components of DHCP server 120, in other implementations fewer, additional, or different components may be utilized. For example, DHCP server component 305 and software upgrade component 310 may be combined into one component. Alternatively, one or more operations described as being performed by DHCP server component 305 or software upgrade component 310 may be performed by the other component (i.e., DHCP server component 305 or software upgrade component 310).

In other embodiments, RADIUS server 140 may include corresponding functional components. For example, RADIUS server 140 may include a RADIUS server component and a software update component (not illustrated). The RADIUS server component may provide for AAA services. The software update component may provide software update information and location information to the RADIUS server component. The RADIUS server component may provide the software update information and the location information in RADIUS messages to network devices 125. Still further, in other embodiments a BOOTP server (not illustrated) or some other type of server which network devices 125-1 through 125-4 may access during boot-up and/or in response to some other type of event. Thus, it will be appreciated that the other type of server need not provide DHCP and/or RADIUS functionality.

Exemplary Network Device Architecture

FIG. 4A is a diagram illustrating exemplary components of device 400 that may correspond to one or more of devices depicted in FIG. 1. For example, device 400 may correspond to network devices 125-1 through 125-4. As illustrated, device 400 may include a controller 405, line interfaces 410-1, 410-2, 410-3, and 410-4 (collectively referred to as line interface 410), and an interconnect 415.

Controller 405 may include, for example, a general purpose processor, a microprocessor, a controller, a data processor, a network processor, a co-processor, an application specific integrated circuit (ASIC), a field programmable gate array (FPGA), discrete hardware components, and/or some other type of component or logic that may interpret and/or execute instructions. Controller 405 may assist in forwarding packets and/or handling traffic flows. Controller 405 may include other components not specifically illustrated. For example, controller 405 may include memory, buses, and/or other type of components.

Line interfaces 410 may include, for example, a network interface card (NIC), a communication port, an infrared interface, a Personal Computer Memory Card International Association (PCMCIA) card, a linecard, an ASIC, or another type of line interface component. Line interfaces 410 may be capable of receiving packets from other devices and transmitting packets to other devices in environment 100. Line interfaces 410 may implement industry promulgated protocol standards, non-standard, proprietary, and/or customized interface protocols. Line interface 410 may include a single port or multiple ports. For example, line interfaces 410 may each include ports 0 and 1 for receiving and forwarding packets, as illustrated in FIG. 4A.

Interconnect 415 may include, for example, a switching fabric or another form of a connection (e.g., a bus) for conveying packets to and from line interfaces 410.

Although FIG. 4A illustrates exemplary components of device 400, in other implementations fewer, additional, different, and/or differently arranged components may be utilized. It will be appreciated that device 400 may be capable of providing services not specifically described herein. For example, device 400 may be capable of providing authentication and/or encryption services. Additionally, or alternatively, device 400 may be capable of handling traffic flows at various layers (e.g., layer two, layer three, etc.).

Exemplary Software Update Components

FIG. 4B is a diagram illustrating exemplary functional components that provide for the automatic updating of software. As illustrated, each of network devices 125 may include a DHCP client component 420 and a software update component 425. DHCP client component 420 and/or software update component 425 may be implemented by software executed by one or more processors (e.g., controller 405 and/or another processor residing in one or multiple line interfaces 410). In other instances, DHCP client component 420 and/or software update component 425 may be implemented by hardware, firmware, and/or other combinations of components.

DHCP client component 420 may communicate with DHCP server component 305 of DHCP server 120 according to the automatic software updating scheme described herein. DHCP client component 420 may utilize various protocols (e.g., DHCP, IP, etc.) and automatically perform various operations according to the automatic software updating scheme. DHCP client component 420 may provide the software update information and the location information to software update component 425. For example, DHCP client component 420 may extract the software update information and the location information from the options field of the DHCP message format (e.g., from a DHCPOFFER message).

Software update component 425 may utilize the software update information and the location information to automatically perform various operations according to the automatic software updating scheme. Software update component 425 may have knowledge of the software information residing on network device 125. The software information may include, for example, the name of the software, the version of the software, and/or some other indicator (e.g., a string) that identifies the software residing on network device 125. Software update component 425 may compare the software update information to the software information and determine whether they are the same. In the event the software update information and the software information are not the same, software update component 425 may retrieve the up-to-date software identified in the software update information based on the location information. For example, software update component 425 may download the up-to-date information from software server 130. Software update component 425 may auto-install the downloaded up-to-date software. Alternatively, when the software update information and the software information are the same, software update component 425 may know that it has the most up-to-date software, and determine that no software update is needed.

Although FIG. 4B illustrates exemplary components of network devices 125, in other implementations fewer, additional, or different components may be utilized. For example, DHCP client component 420 and software upgrade component 425 may be combined into one component. Alternatively, one or more operations described as being performed by DHCP client component 420 or software upgrade component 425 may be performed by the other component (i.e., DHCP client component 420 or software upgrade component 425).

In other embodiments, network devices 125 may include a RADIUS client component and a software update component (not illustrated). The RADIUS client component may communicate with the RADIUS server component when seeking AAA services. The software update component may obtain the software update information and the location information from a RADIUS message and compare the software update information to software information residing on network device 125. Similar to that previously described, in the event that the software update information and the software information are not the same, the software update component may retrieve the up-to-date software identified in the software update information based on the location information. Alternatively, when the software update information and the software information are the same, the software update component may determine that no software update is needed. Still, in other embodiments, network devices 125 may include a BOOTP client component and a software update component (not illustrated).

Exemplary Process

Figure 5A:
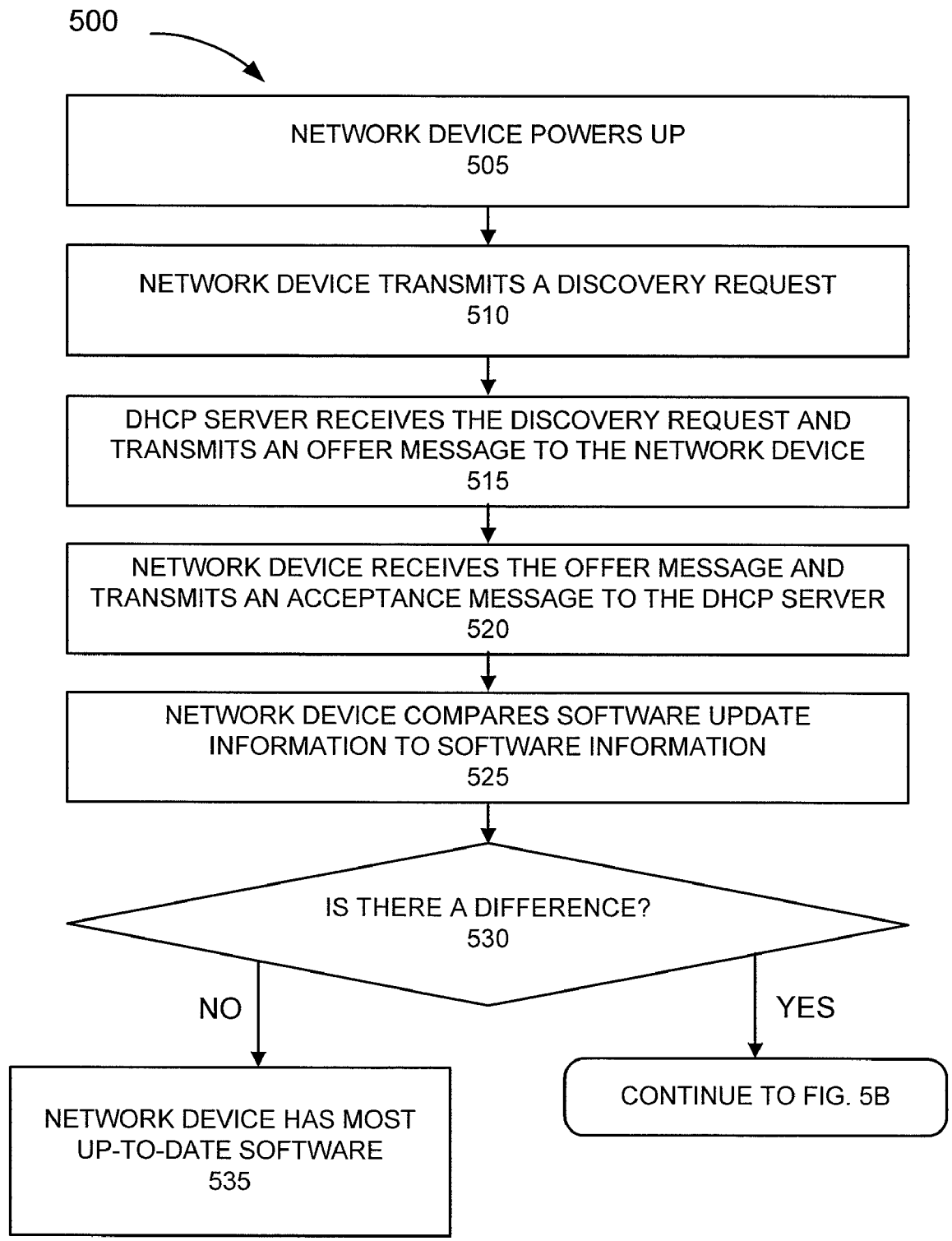
FIGS. 5A-5B are flow diagrams illustrating an exemplary process for automatically updating software for network devices.
Figure 5B:
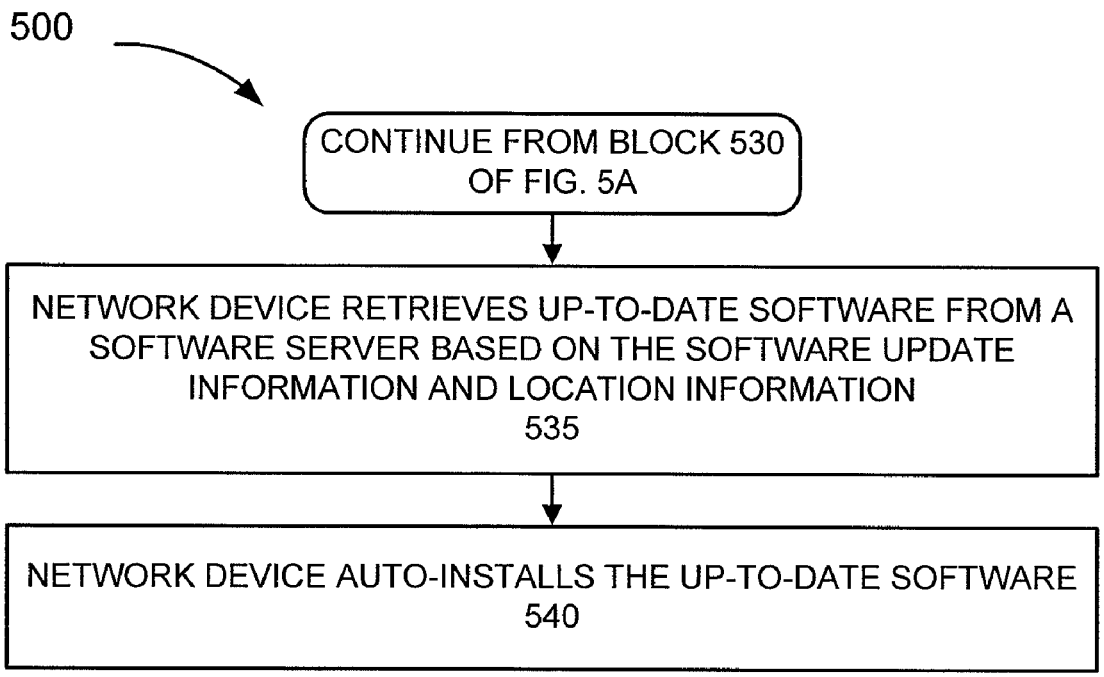
Figure 5C:
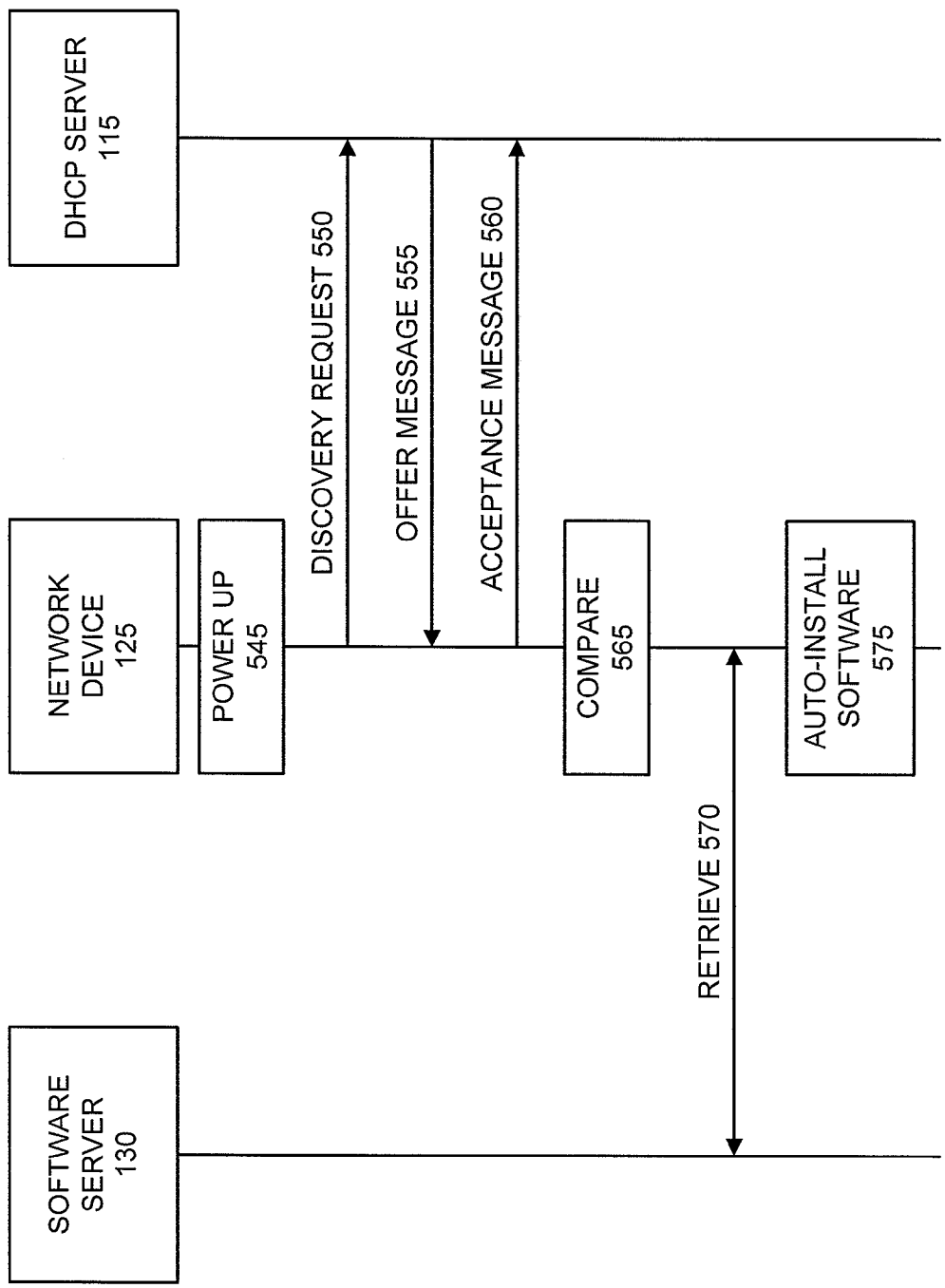
FIG. 5C is a diagram illustrating exemplary messages that may be used for performing the exemplary process of FIGS. 5A-5B.

FIGS. 5A and 5B are flow diagrams illustrating an exemplary process 500 for automatically updating software. The automatic software update process will be described in conjunction with other figures. FIG. 5C is a diagram that illustrates exemplary messages that may be used for performing exemplary process 500. For purposes of discussion, software update information and location information will be provided by a DHCP server (e.g., DHCP server 120) in response to a network device boot-up. However, as previously described, other events (e.g., a schedule, IP address lease time expiration, etc.) may trigger the automatic software update process and/or other devices (e.g., RADIUS server) may be employed. Process 500 will refer to network device 125, which may correspond to any of network devices 125-1 through 125-4.

Process 500 may begin with a network device powering-up (block 505). Network device 125 may power-up 545, as illustrated in FIG. 5C. This may occur after a power failure, maintenance of network device 125, adding a new network device to network 115, etc.

The network device may transmit a discovery request (block 510). For example, network device 125 may broadcast a discovery request 550 (e.g., a DHCPDISCOVER message) in network 115 to find a DHCP server and acquire an IP address (e.g., after powering-up or booting-up is completed). Discovery request 550 may include, for example, a default source address (e.g., 0.0.0.0) indicating that DHCP client component 420 does not currently have an IP address, a Media Access Control (MAC) address, device name, etc.

The DHCP server may receive the discovery request and transmit an offer message to the network device (block 515). Once DHCP server 120 receives discovery request 550, DHCP server component 305 may generate an offer message 555 (e.g., a DHCPOFFER message). Offer message 555 may include, for example, the source address of DHCP server 120, an IP address that is offered to network device 125, subnet mask parameter values, lease renewal times, duration of the lease, etc. In other instances, offer message 555 may include different information, when, for example, the IP address is static, etc. Additionally, offer message 555 may include software update information and location information. Software update component 310 may insert the software update information and the location information in offer message 555. For example, software update component 310 may insert the software update information and the location information in an options field of the DHCPOFFER message.

The network device may receive the offer message and transmit an acceptance message to the DHCP server (block 520). Network device 125 may receive offer message 555 and transmit an acceptance message 560 (e.g., a DHCPRE-QUEST message) indicating that DHCP client component 420 accepts the offered IP address. Network device 125 may also transmit additional messages (not illustrated) to obtain additional configuration information (e.g., default gateway, etc.).

The network device may compare the software update information to software information (block 525). Software update component 425 of network device 125 may extract the software update information from offer message 555. Software update component 425 may compare 565 the software update information from offer message 555 with its own software information. The software information may include the software (e.g., name of software, version of the software, etc.) residing on network device 125.

The network device may determine whether there is a difference (block 530). Software update component 425 may determine whether there is a difference between the software update information and its own software information based on the comparison. As previously described, the difference may correspond to, for example, a different version of software or software that does not currently reside on network device 125. When software update component 425 determines that there is no difference (block 530—NO), then network device 125 may know that it has the most up-to-date software. In this instance, software update component 425 may determine that no software update is needed.

Alternatively, when software update component 425 determines that there is a difference (block 530—YES), then network device 125 may proceed to block 535 to retrieve the up-to-date software.

The network device may retrieve up-to-date software from the software server based on the software update information and location information (block 535). Network device 125 may retrieve 570 from software server 130 the up-to-date software based on the software update information and location information. As previously described, the location information may correspond to the IP address of software server 130. Network device 125 may download the up-to-date software corresponding to the software update information from software server 130. For example, the up-to-date software may be accessed via network file system (NFS) protocol or Web-based Distributed Authoring and Versioning (WebDAV) protocol.

The network device may auto-install the up-to-date software (block 540). Software update component 425 may auto-install the up-to-date software 575 on network device 125.

Although FIGS. 5A and 5B illustrate an exemplary process 500, in other implementations, fewer, additional, or different operations may be performed. For example,

CONCLUSION

The foregoing description of implementations provides an illustration, but is not intended to be exhaustive or to limit the implementations to the precise form disclosed. Modifications and variations are possible in light of the above teachings or may be acquired from practice of the teachings. For example, when network device 125 seeks access to network 115, AAA scheme may be employed. For example, a RADIUS server may authenticate, authorize and account network device 125. In such an instance, network device 125 may transmit a RADIUS Access Request message to the RADIUS server. The RADIUS server may provide a response (e.g., Access Challenge message) to network device 125 to ensure that network device 125 has the most up-to-date software. The response may include software update information and location information. Similar to that previously described, network device 125 may compare its own software information with the software update information to determine whether a software update is needed. Still further, as previously described, a BOOTP server may be utilized to provide software update information and location information. More generally speaking, any type of device (e.g., a server) may be utilized to provide the software update information and the location information to other network devices 125 during a negotiation process (e.g., a DHCP process, a RADIUS process, or some other type of process).

In addition, while a series of blocks has been described with regard to the process illustrated in FIGS. 5A and 5B, the order of the blocks may be modified in other implementations. Further, non-dependent blocks may be performed in parallel. Further, it may be possible to omit blocks within process 500.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
   transmitting, by a network device and to another device, a request indicating that the network device does not currently have an assigned network address or that a lease of the assigned network address is about to expire;
   receiving, by the network device and from the other device, an offer message that offers a new network address to the network device,
      the offer message including software update information and location information that are inserted into a particular portion of the offer message,
      the software update information identifying an up-to-date software that the network device should have installed, and
      the location information identifying a location from which to retrieve the up-to-date software;
   determining, by the network device, that the software update information is different from corresponding software information that identifies software currently installed on the network device;
   retrieving, by the network device and from the location, the up-to-date software after determining that the software update information is different from the corresponding software information; and
   installing, by the network device, the up-to-date software.

2. The method of claim 1, where the network device includes a router or a switch.

3. The method of claim 2, where the other device includes a Dynamic Host Configuration Protocol (DHCP) server.

4. The method of claim 1,
   where the software update information includes a name and a version of the up-to-date software, and
   where the corresponding software information includes a name and a version of the software currently installed on the network device.

5. The method of claim 1, where transmitting the request includes:
   powering up or booting up, by the network device, and transmitting the request after the powering up or booting up is completed.

6. The method of claim 1, where the new network address includes an Internet Protocol (IP) address.

7. The method of claim 1,
   where the request includes a DHCPDISCOVER message, and
   where the offer message includes a DHCPOFFER message.

8. A device comprising:
   one or more processors to:
      send a request to another device,
         the request indicating that the device does not currently have an assigned network address or that a lease of the assigned network address is about to expire;
      receive, form the other device, an offer message that offers a new network address to the device,
         the offer message including software update information and a network address that are inserted into a particular portion of the offer message,
         the software update information identifying an up-to-date software that the device should have installed, and
         the network address identifying a location from where the up-to-date software can be retrieved;
      determine that the software update information is different from corresponding software information that identifies software currently installed on the device;
      retrieve the up-to-date software based on the network address after determining that the software update information is different from the corresponding software information; and
      install the up-to-date software.

9. The device of claim 8, where the device includes a router or a switch.

10. The device of claim 8, where the other device includes a Dynamic Host Configuration Protocol (DHCP) server.

11. The device of claim 8, where the request includes a DHCPDISCOVER message.

12. The device of claim 8, where the offer message includes a DHCPOFFER message.

13. The device of claim 8, where the one or more processors are further to:
   transmit an acceptance message that indicates an acceptance the assignment of the new network address for the device.

14. A non-transitory computer-readable medium comprising:
   one or more instructions that, when executed by at least one processor of a device, cause the at least one processor to:
      transmit, to another device, a request indicating that the device does not currently have an assigned network address or that a lease of the assigned network address is about to expire;
      receive, from the other device, an offer message that offers a new network address to the device;
      extract from a particular portion of the offer message, software update information and an address,
         the software update information identifying an up-to-date software that should be installed in the device, and
         the address identifying a location from where the up-to-date software can be retrieved;
      determine that the software update information does not match corresponding software information that identifies software currently installed on the device;
      retrieve, from the location identified by the address, the up-to-date software at the address after determining that the software update information does not match the corresponding software information; and
      install the up-to-date software.

15. The non-transitory computer-readable medium of claim 14, where the one or more instructions to transmit the request include:
one or more instructions to:
boot-up the device, and
transmit the request after the boot-up of the device is completed.

16. The computer-readable memory device of claim 14, where the device includes a router or a switch.

17. The computer-readable memory device of claim 14,
where the offer message includes a DHCPOFFER message, and
where the particular portion includes an options field of the DHCPOFFER message.

18. A network device comprising:
one or more processors to:
transmit a DHCPDISCOVER message to a Dynamic Host Configuration Protocol (DHCP) server,
the DHCPDISCOVER message indicating that the device does not currently have an assigned network address or that a lease of the assigned network address is about to expire;
receive a DHCPOFFER message from the DHCP server,
the DHCPOFFER message including an offer for a new network address for the device;
extract, from a particular portion of the DHCPOFFER message, software update information and location information,
the software update information identifying an up-to-date software that the network device should have installed, and
the location information identifying a location from which to retrieve the up-to-date software;
determine that the software update information is different from corresponding software information that identifies software currently installed on the network device;
retrieve the up-to-date software based on the software update information and the location information after determining that the software update information is different from the corresponding software information; and
install the up-to-date software.

19. The network device of claim 18, where the one or more processors are further to:
transmit a DHCPREQUEST message that indicates an acceptance of the new network address for the network device.

20. The network device of claim 18, where, when retrieving the up-to-date software, the one or more processors are to:
access the up-to-date software via a network file system (NFS) protocol or a Web-based Distributed Authoring and Versioning (WebDAV) protocol.

21. The network device of claim 18,
where the software update information includes information identifying a first version of the up-to-date software,
where the software update information includes information identifying a second version of the software currently installed on the network device, and
where, when determining that the software update information is different from the corresponding software information, the one or more processors are to:
determine that the first version is different from the second version, and
determine that the software update information is different from the corresponding software information based on the first version being different from the second version.

\* \* \* \* \*